Nov. 2, 1954

C. W. PERKINS 2,693,573

TRANSFORMER ON-LOAD TAP CHANGING MECHANISMS

Filed Dec. 21, 1950

INVENTOR.
CHESTER W. PERKINS
BY
*Em Harrington,*
ATTORNEY

Nov. 2, 1954  C. W. PERKINS  2,693,573
TRANSFORMER ON-LOAD TAP CHANGING MECHANISMS
Filed Dec. 21, 1950  11 Sheets-Sheet 2

INVENTOR.
CHESTER W. PERKINS
BY
*Tm Harrington*
ATTORNEY

*INVENTOR.*
CHESTER W. PERKINS
BY
*Em Harrington.*
*ATTORNEY*

Nov. 2, 1954     C. W. PERKINS     2,693,573
TRANSFORMER ON-LOAD TAP CHANGING MECHANISMS
Filed Dec. 21, 1950     11 Sheets—Sheet 7

INVENTOR.
CHESTER W. PERKINS
BY
*Em Harrington*
ATTORNEY

C. W. PERKINS 2,693,573

TRANSFORMER ON-LOAD TAP CHANGING MECHANISMS

Filed Dec. 21, 1950

INVENTOR.
CHESTER W. PERKINS
BY

ATTORNEY

Nov. 2, 1954

C. W. PERKINS 2,693,573

TRANSFORMER ON-LOAD TAP CHANGING MECHANISMS

Filed Dec. 21, 1950

INVENTOR.
CHESTER W. PERKINS
BY
*Em. Harrington,*
ATTORNEY

United States Patent Office 2,693,573
Patented Nov. 2, 1954

2,693,573

TRANSFORMER ON-LOAD TAP CHANGING MECHANISMS

Chester W. Perkins, Normandy, Mo., assignor to Moloney Electric Company, St. Louis, Mo., a corporation of Delaware Application December 21, 1950, Serial No. 202,090

20 Claims. (Cl. 323—43.5)

This invention relates generally to transformer tap changers and more specifically to tap changers which are adapted for the regulation of the voltage of transformers while said transformers are carrying load, the predominant object of the invention being to provide an under-load tap changer for transformers which possesses greater sensitivity and ease of adjustment than did the underload tap changers heretofore known.

The drawings illustrate for purposes of illustration, merely, one embodiment of the invention, and the illustrated tap changer under load includes three distinct yet interconnected assemblies, each designed to meet its particular function, and all of said assemblies are driven from a common source of power. The three assemblies referred to comprise (a) tap changing mechanism, (b) driving mechanism and auxiliary equipment, and (c) automatic control equipment.

Figure 8:
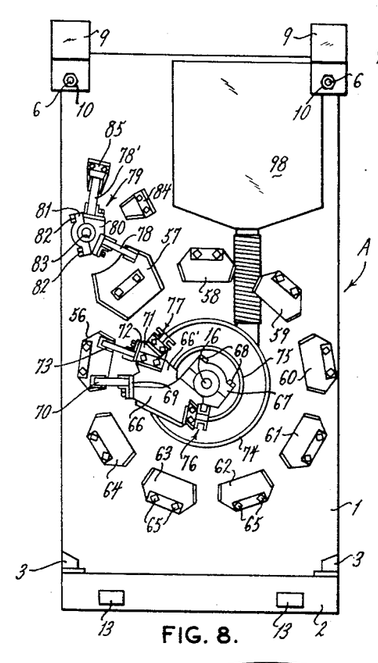
Fig. 8 is an elevational view of a switch assembly of the mechanism of this invention.
Figure 9:
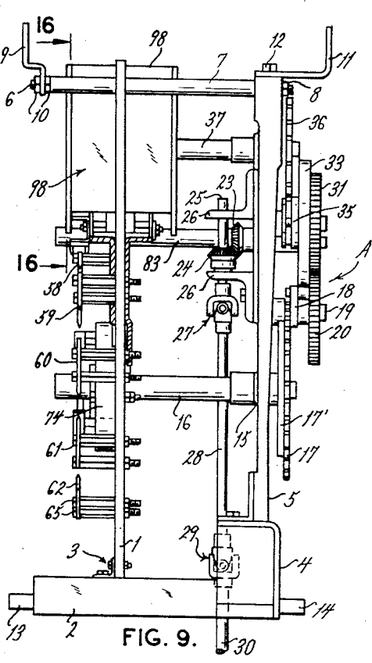
Fig. 9 is a side elevation of the mechanism shown in Fig. 8.

The tap changing mechanism of the present invention is designated generally in Figs. 8 and 9 by the reference character A and said mechanism includes a panel 1 that is formed from suitable electrical insulating material. The panel 1 is supported by a base frame 2, said panel being secured to said base frame through the instrumentality of angle bars and bolt and nut assemblies as indicated by the reference character 3. At the rear of the base frame 2, an upstanding frame portion 4 is provided which supports and has fixed thereto a rear frame member 5 (Fig. 9). The rear frame member 5 supports at its upper opposed corners a pair of elongated, forwardly extended bolts 6, each of said bolts being embraced by a tubular structure 7 formed of suitable insulating material and the panel 1 being provided with openings through which said tubular structures extend. The bolts 6 are secured in place with respect to the rear frame member 5 by nuts 8, and at the forward ends of said bolts brackets 9 are secured thereto by nuts 10. Also, opposed brackets 11 are secured to the rear frame member 5 at the top thereof by means of bolts 12. The brackets 9 and 11 together with lugs 13 and 14 formed on the base frame and the rear frame portion 4 are employed for securing the tap changing mechanism in place for use.

Figure 10:
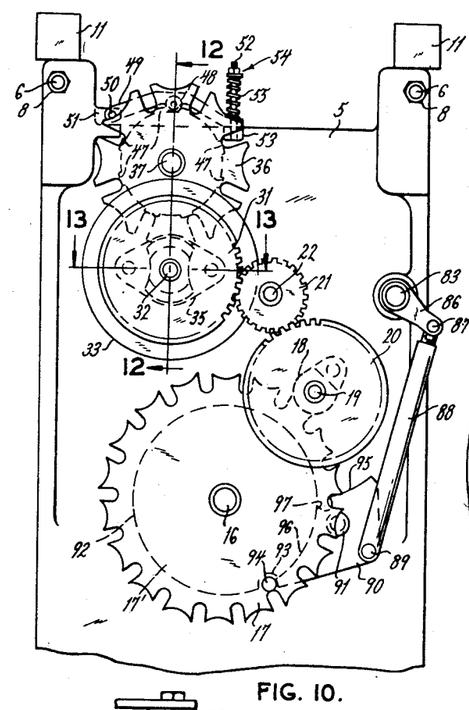
Fig. 10 is a fragmentary, elevational view of the switch assembly illustrated in Figs. 8 and 9 and showing gearing employed for driving the selector, load transfer and reversing switches, and for timing their operations.

Supported for rotation in a bearing 15 which forms a part of the rear frame member 5 is a shaft 16 on which is fixedly mounted at its rear end a Geneva gear 17 (Fig. 10). The Geneva gear 17 has cooperatively associated therewith a Geneva pinion 18 which is fixedly mounted on a shaft 19 for rotation therewith, said shaft being supported for rotation by the rear frame member 5 and having fixedly mounted thereon, also, a gear wheel 20. The gear wheel 20 meshes with a gear pinion 21 which is fixedly mounted on a shaft 22 that is supported for rotation by the rear frame member 5. The shaft 22 fixedly supports a bevel gear 23 that is disposed forwardly of the rear frame member 5, as is shown in Fig. 9, and this bevel gear 23 meshes with a second bevel gear 24 which is fixedly mounted on a shaft 25 that is supported for rotation in a vertical position by a pair of vertically spaced angle members 26 fixed to the rear frame member 5. The shaft section 25 is connected at its lower end through the instrumentality of a universal joint 27 to a shaft section 28 and said shaft section 28 in turn is connected at its lower end through the instrumentality of a universal joint 29 to a shaft section 30. As will presently appear herein in greater detail, the shaft section 30 is connected into the drive assembly of the tap changer of the present invention.

Figures 12, 13:
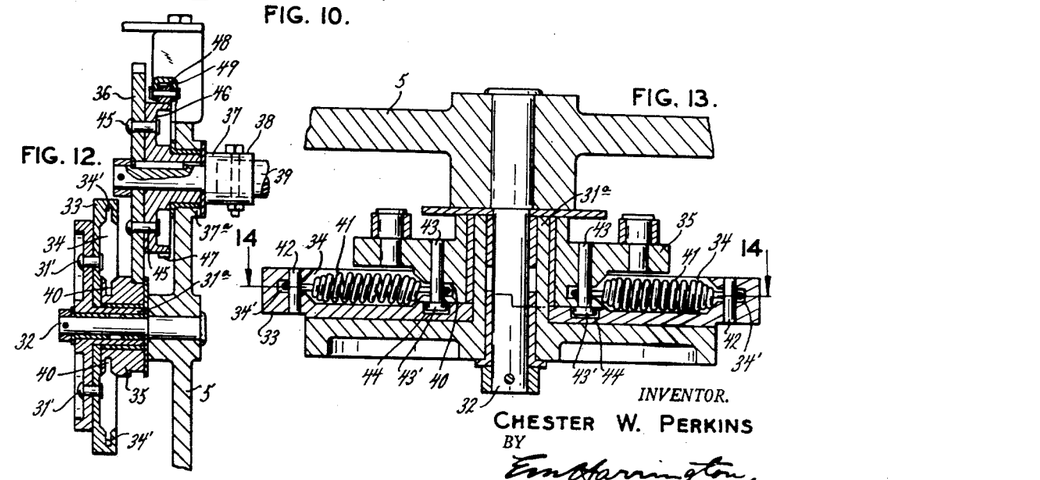
Fig. 12 is an enlarged, vertical section taken on line 12—12 of Fig. 10.
Fig. 13 is an enlarged, horizontal section taken on line 13—13 of Fig. 10.

Arranged in mesh with the gear pinion 21 is a gear wheel 31 (Fig. 10) which is mounted for rotation on a shaft 32 that is supported by rear frame member 5. The gear wheel 31 is secured by fastening elements 31' to a structure 33, said structure 33 having an opening formed centrally therethrough through which the hub portion 31a of the gear wheel 31 extends (Fig. 12). The structure 33 is provided with an annular recess 34 from which is extended outwardly a narrower recess extension 34' which also is of annular formation. Mounted for rotation on the shaft 32 is a Geneva pinion 35 that is cooperatively related to a Geneva gear 36, and said Geneva gear is fixedly mounted on a shaft section 37 that is supported for rotation in a bearing 37a forming a part of the rear frame member 5. The shaft section 37 is provided with a socket portion 38 which receives an end portion of a shaft 39. The Geneva pinion is provided with an annular groove 40 which corresponds in shape and dimensions with the recess extension 34' of the structure 33, said annular groove 40 of the Geneva pinion being alined with the recess extension, as is shown to good advantage in Figs. 12 and 13.

Figures 14, 15:
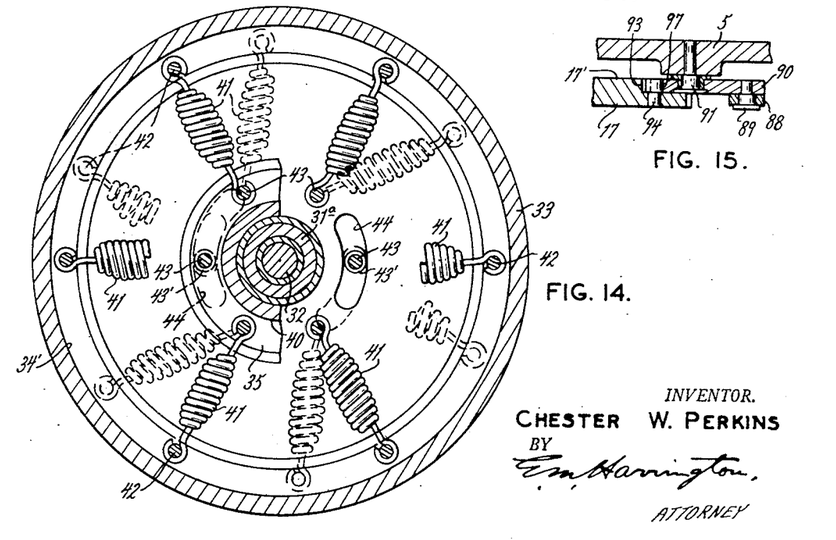
Fig. 14 is a section taken on line 14—14 of Fig. 13.
Fig. 15 is a fragmentary section taken on line 15—15 of Fig. 11.

By referring to Figs. 13 and 14 it will be noted that a plurality of coil springs 41 are employed, these coil springs being arranged as is shown in Fig. 14 with an end portion of each coil spring projected into the annular recess extension 34' of the structure 33 and secured therein by means of a pin 42, and with the opposite end portion of each coil spring projected into the annular groove 40 of the Geneva pinion 35 and secured therein by means of a pin 43. By referring to Fig. 13 it will be noted that two of the pins 43 are provided with heads 43', the pins 43 other than the two headed pins being unheaded. Also Figs. 13 and 14 show that a wall of the structure 33 is provided with a pair of arcuate grooves 44 and the heads 43' of said two headed pins are disposed in said arcuate grooves, such arrangement being for a purpose to be hereinafter explained.

The Geneva gear 36 has secured thereto by means of fastening elements 45, an element 46, said element 46 being shaped in section as is shown in Fig. 12 and being provided with four pairs of spaced teeth 47 which are spaced circumferentially of the element 46. The circumferential face of the element 46 is contacted by a roller 48 which is supported for rotation by an arm 49 that is pivoted at 50 to a lug 51 extended from a portion of the rear frame member 5 (Fig. 10). At the end of the arm 49 opposite to the pivoted end thereof, said arm has an opening formed therethrough through which a rod 52 is extended, said rod being supported in a vertical position by a lug 53 formed on the rear frame member 5. The rod 52 is screwthreaded at its upper portion and a nut and washer assembly 54 is mounted on said screwthreaded rod portion, there being a coil spring 55 disposed in embracing relation with respect to said rod 52 with one end of said coil spring contacting with the washer and the opposite end of said coil spring contacting with the free end portion of said arm 49.

The tap selector assembly (Figs. 8 and 9) consists of nine stationary contacts which are designated in the drawings by the reference characters 56, 57, 58, 59, 60, 61, 62, 63, and 64, said stationary contacts being secured to the panel 1 by bolts 65 in spaced, circular arrangement and in outwardly spaced relation with respect to the panel 1. Also, mounted on the previously mentioned shaft 16 for rotary movement therewith is a switch contact arm 66, said switch contact arm being clamped to said shaft 16 through the instrumentality of a clamping block 67 and clamping bolts 68. The switch contact arm 66 is provided with a flange 69 to which is bolted, or otherwise secured a contact assembly 70 that is adapted to contact with the stationary contacts 56—64 in a manner and for a purpose to be hereinafter explained. The switch contact arm 66 has secured thereto an extension 66', formed of insulating material, to which is bolted a member 71 that is provided with a flange 72, and bolted, or otherwise secured to said flange 72 is a contact assembly 73, said contact assembly 73 also being adapted to contact with the stationary contacts 56—64 in a manner and for a purpose to be hereinafter set forth. The selector switch assembly includes a collector ring 74 and a collector ring 75, said collector rings 74 and 75 being suitably secured to the panel 1. The collector ring 74 is of larger diameter than the collector ring 75 and said collector rings are arranged on the panel 1 as is shown in Fig. 8, with the larger collector ring 74 embracing the collector ring 75. The collector ring 75 is contacted by a contact assembly 76 which is bolted, or otherwise secured, to the switch contact arm 66, and in like manner, the member 71 has bolted, or otherwise secured, thereto a contact assembly 77 which contacts with the collector ring 74.

Figure 11:
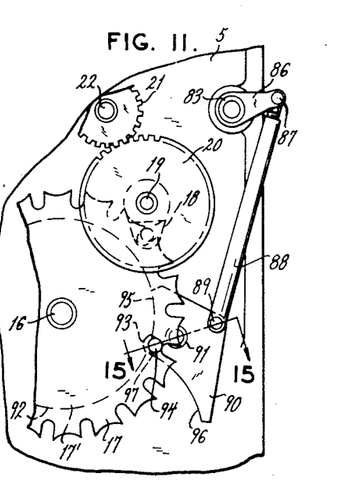
Fig. 11 is a fragmentary, elevational view illustrating part of the mechanism shown in Fig. 10, but illustrating certain parts in changed positions.

The stationary contact 57 (Fig. 8) is of increased height when compared with the stationary contact 56 and the stationary contacts 58—64, and contacting with said stationary contact 57 is a contact assembly 78 of a reversing switch assembly 79. The reversing switch assembly includes a member 80 which is clamped by a clamping block 81 and clamping bolts 82 to a shaft 83, said shaft being supported for rotary movement by the rear frame member 5 and the panel 1. The member 80 supports a second contact assembly 78' which is adapted to contact with the stationary contacts 84 and 85, both of which are supported by the panel 1 in outwardly spaced relation with respect thereto, and stationary contacts 57, 84, and 85 being arranged in arcuate relation, as is shown in Fig. 8. Fixedly mounted on the shaft 83 at the rear of the rear frame member 5 is an arm 86 (Figs. 10 and 11) to which is pivotally attached by means of a pivot 87, a link 88. The link 88 is pivotally attached at its opposite end by means of a pivot 89 to a cam 90, said cam being mounted for oscillatory movement by a pivot element 91 which is supported by the rear frame member 5. By referring to Fig. 15 it will be noted that the Geneva gear 17 is provided with a rear portion 17' which is of increased thickness, when compared with the outer, annular portion of said Geneva gear, and the presence of this portion of increased thickness provides the Geneva gear with an annular shoulder 92 in which a depression 93 is formed. Also the Geneva gear 17 has mounted thereon a pin 94, said pin having a portion which is disposed fixedly in an aperture formed in the Geneva gear and a portion of slightly increased diameter which projects rearwardly from said Geneva gear 17. The cam 90 is shaped as is shown in Figs. 10 and 11; that is to say, said cam is provided with an arcuate edge portion 95 and an arcuate edge portion 96, and a notch 97 is formed in the cam adjacent to an end portion of said arcuate edge portion 95.

Figure 16:
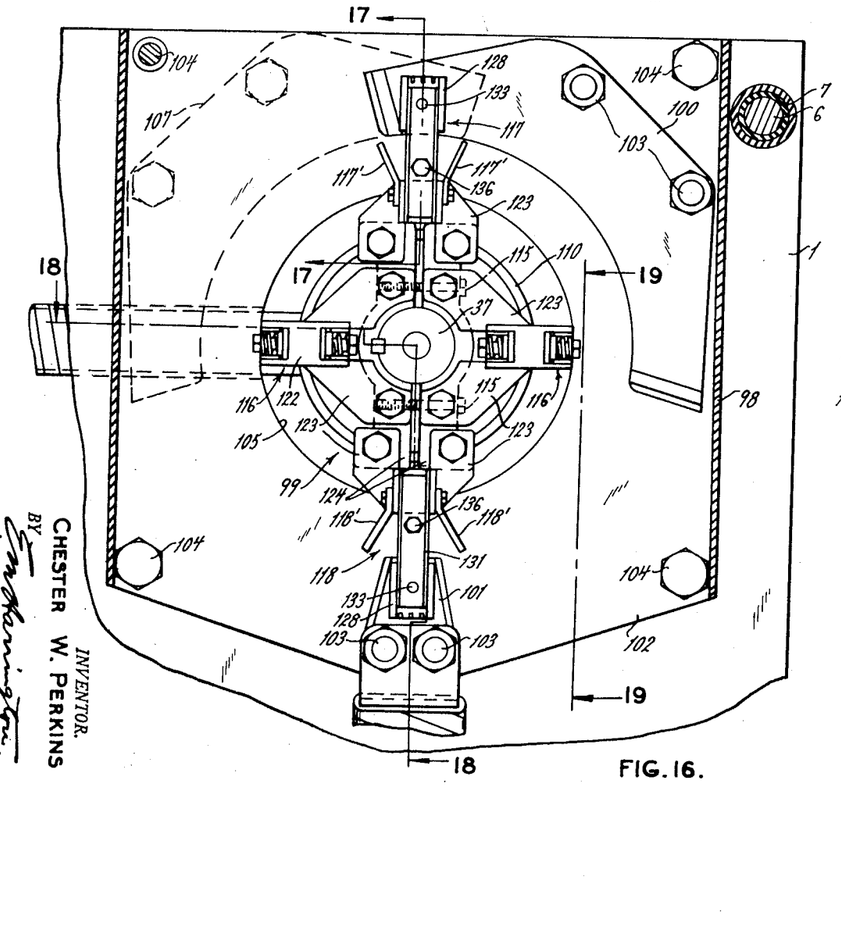
Fig. 16 is an enlarged, vertical section taken on line 16—16 of Fig. 9.
Figures 18, 19, 20, 21:
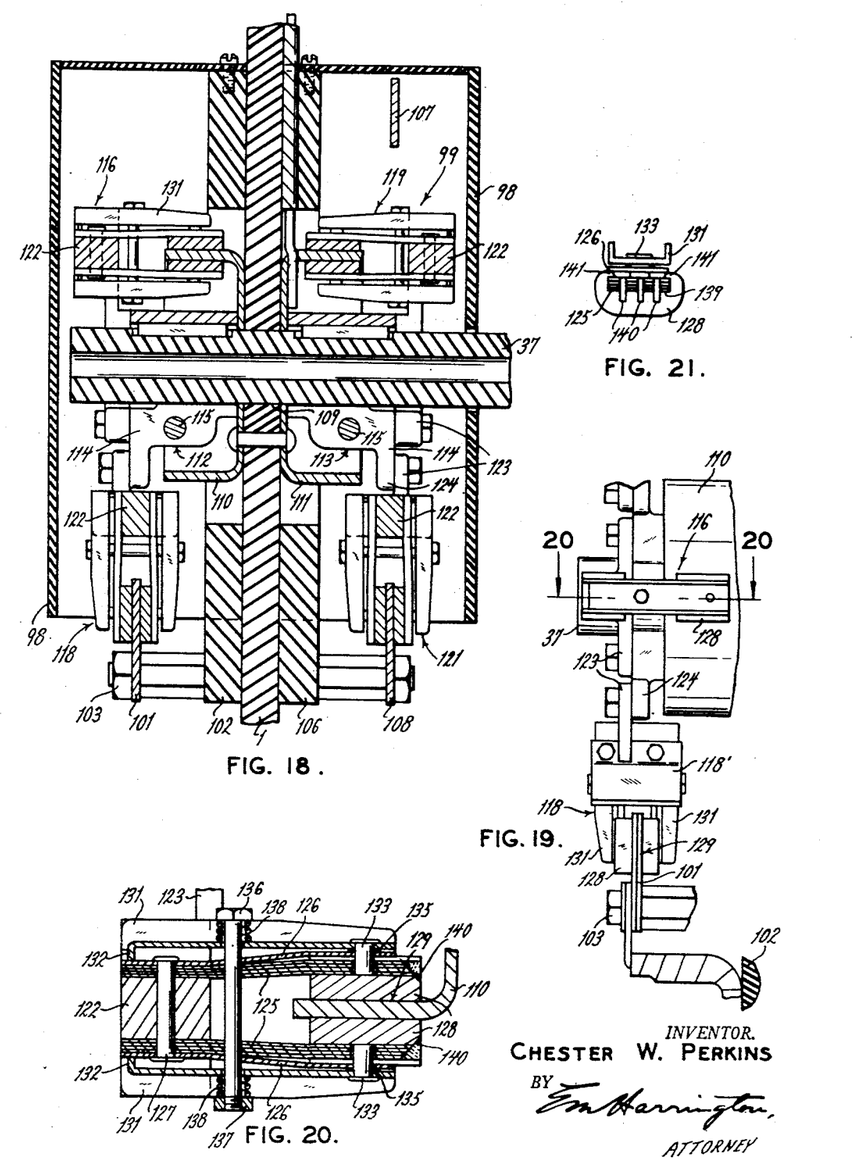
Fig. 18 is an enlarged section taken on the angular line 18—18 of Fig. 16.
Fig. 19 is a fragmentary, elevational view taken on line 19—19 of Fig. 16.
Fig. 20 is an enlarged, horizontal section taken on line 20—20 of Fig. 19.
Fig. 21 is an end elevation of a part of the contact structure shown in Fig. 20.

By referring to Figs. 8 and 9 it will be noted that the panel 1 supports a housing 98 in which is contained the load transfer switch assembly 99 of the tap changer of this invention, the shaft 37, which has been previously mentioned herein and on which the Geneva gear 36 is mounted, being extended into said housing. The load transfer switch 99 includes a stationary contact 100 which is shaped as is shown in Fig. 16, and a second stationary contact 101, said stationary contacts 100 and 101 being located at the forward side of the panel 1 and being spaced forwardly from a supporting member 102, formed of electrical insulating material, by which said stationary contacts are supported through the instrumentality of the bolts 103. The supporting member 102 in turn is secured by the fastening devices 104 to the panel 1 and the supporting member 102 has formed centrally thereof an opening 105. In like manner, a supporting member 106 similar to the supporting member 102 is located at the rear of the panel 1 and is secured thereto by the previously mentioned fastening devices 104. The supporting member 106 has fixed thereto in rearwardly spaced relation with respect thereto, a stationary contact 107, which is similar to the stationary contact 100, and a stationary contact 108, which is similar to the stationary contact 101. The stationary contact 108 is located at the lower center of its supporting member 106, as is the stationary contact 101, but the stationary contact 107 is located at the opposite side of its supporting member 106 when compared with the position of the stationary contact 100, as is indicated by broken lines in Fig. 16. The panel 1 is provided with an opening 109 (Fig. 18) through which the shaft 37 extends and surrounding said opening and secured to said panel by rivets is a pair of collector rings 110 and 111, the collector ring 110 being located at the forward face of the panel 1, while the collector ring 111 is located at the rear face of said panel 1.

Supported by the shaft 37, which is formed of electrical insulating material, is a pair of contact mounting units 112 and 113, the mounting assembly 112 being located forwardly of the panel 1, while the mounting assembly 113 is located rearwardly of said panel. Each mounting assembly comprises a pair of members 114 which embrace the shaft 37 and which are clamped to and about said shaft by clamping bolts 115, and each contact mounting unit made up of a related pair of members is keyed, or otherwise secured, to the shaft 37 for rotation therewith. The contact mounting unit 112 includes a pair of contacts 116 which contact with the collector ring 110, a contact 117, and a contact 118, said contacts 117 and 118 being adapted to contact with the stationary contacts 100 and 101. In like manner, the contact mounting unit 113 includes a pair of contacts 119 which contact with the collector ring 111, a contact 120, and a contact 121, said contacts 120 and 121 being adapted to contact with the stationary contacts 107 and 108.

Figure 17:
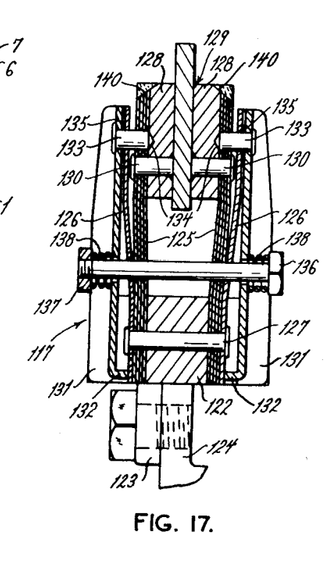
Fig. 17 is an enlarged section taken on line 17—17 of Fig. 16.

Fig. 17 illustrates the contact 117 and in this view 122 designates a member that is provided with a mounting lug 123 adapted for attachment to a mounting base 124. The member 122 has secured thereto at opposite sides thereof laminated shunts 125 and, also, at each side of the contact is located a leaf spring 126, said leaf spring being disposed outwardly of the shunts 125. The shunts 125 and the leaf springs 126 are secured to the member 122 by means of a copper rivet 127, and at the opposite ends of the shunts each shunt has fixed thereto a contact button 128, the opposed contact buttons being normally spaced apart to provide a space 129 therebetween. Each contact button 128 is secured to the shunt 126 with which it is associated by a copper rivet 130, said rivet being countersunk in a face portion of the button and being provided with a head at its opposite end which engages the associated shunt. The contact shown in Fig. 17 includes pressure plates 131 which are located at opposite sides of the contact structure, each pressure plate being channel-shaped in cross-section (see Fig. 21) and having inwardly projected extensions 132 which engage the outer faces of the leaf springs 126. At the opposite ends of the pressure plates 131 each thereof is provided with an inwardly projected pin 133 which extends through an opening formed through a wall portion of the pressure plate and is riveted to said pressure plate. The pins 133 project through openings formed through the leaf springs 126 and through openings formed through the shunts 125, and the end portions of said pins are disposed in seats 134 formed in the contact buttons, there being washers 135 located between the leaf springs and the pressure plates through which the pins 133 extend.

The contact structure 117 includes, also, a bolt 136 which is headed at one end and screwthreaded at its opposite end to receive a nut 137. The shank of the bolt 136 extends through alined apertures formed through the pressure plates 131, the leaf springs 126, and the shunts 125, and arranged in one case between the head of the bolt and the adjacent pressure plate 131, and in the other case between the nut 137 and the adjacent pressure plate 131 are coil springs 138. By referring to Fig. 21 it will be noted that the contact button 128 shown therein is provided with a recess 139 and this recess extends throughout the length of the button from end to end thereof, this recess receiving the end portion of the related shunt 125. Also, slots 140 are cut through the shunt 125 and into the contact button 128, and, therefore, when heat is applied to the copper shunt and button with the shunt assembled with the button, a higher melting point solder may be flowed into the slots to make a solid bond between the shunt and the contact button. Before the buttons and shunts are assembled the opposite side walls of the buttons extend upwardly so that the buttons in cross-section are substantially U-shaped. To assemble a shunt and a contact button without the use of the rivets 130, the proper end portion of the shunt is disposed in the recess 139 of the button after which the upstanding side walls of the button are peened over opposed side portions of the shunt, as is shown at 141 in Fig. 21, so as to obtain the desired secure attachment between the shunt and the contact button. In use the bolt 136 may shift to satisfy the alinement pressure at a contact blade without leading to a variation in the ultimate contact pressure as created by the coil springs 138. The leaf springs 126 are employed to hold the contact buttons approximately in line to receive the stationary contact blades. However, considerable misalinement may be present without affecting the ultimate contact pressure and temperature rise when the contact is carrying current. Attention is directed to the fact that the contact buttons 128 of the contact structure 117 which is shown in Fig. 17, may be formed of copper-tungsten alloy for arcing purposes.

It is to be noted that the contact structure 118 of the load transfer switch assembly 99 is a duplicate of the contact structure illustrated by Fig. 17 and described above. However, the contacts 116 differ slightly from the structure of the contacts 117 and 118 in the manner of mounting said contacts 116. Also, the contacts 116 are not provided with the rivets 130, shown in Fig. 17, but instead the peened over portions 141 of the opposed walls of the contact buttons (Fig. 21) are relied on for securely attaching the contact buttons and shunts together. Insofar as the structure of the contact shown in Fig. 20 agrees with the structure of the contact shown in Fig. 17, the same reference characters employed in Fig. 17 are applied to like parts in Fig. 20. It is pointed out, also, that the contacts 70, 73, 76, and 77 of the tap selector switch assembly, and the contacts 78 and 78′ of the reversing switch, except for slight modifications are constructed in accordance with the contact shown in Fig. 20.

OPERATING MECHANISM

Figures 4, 5, 6:
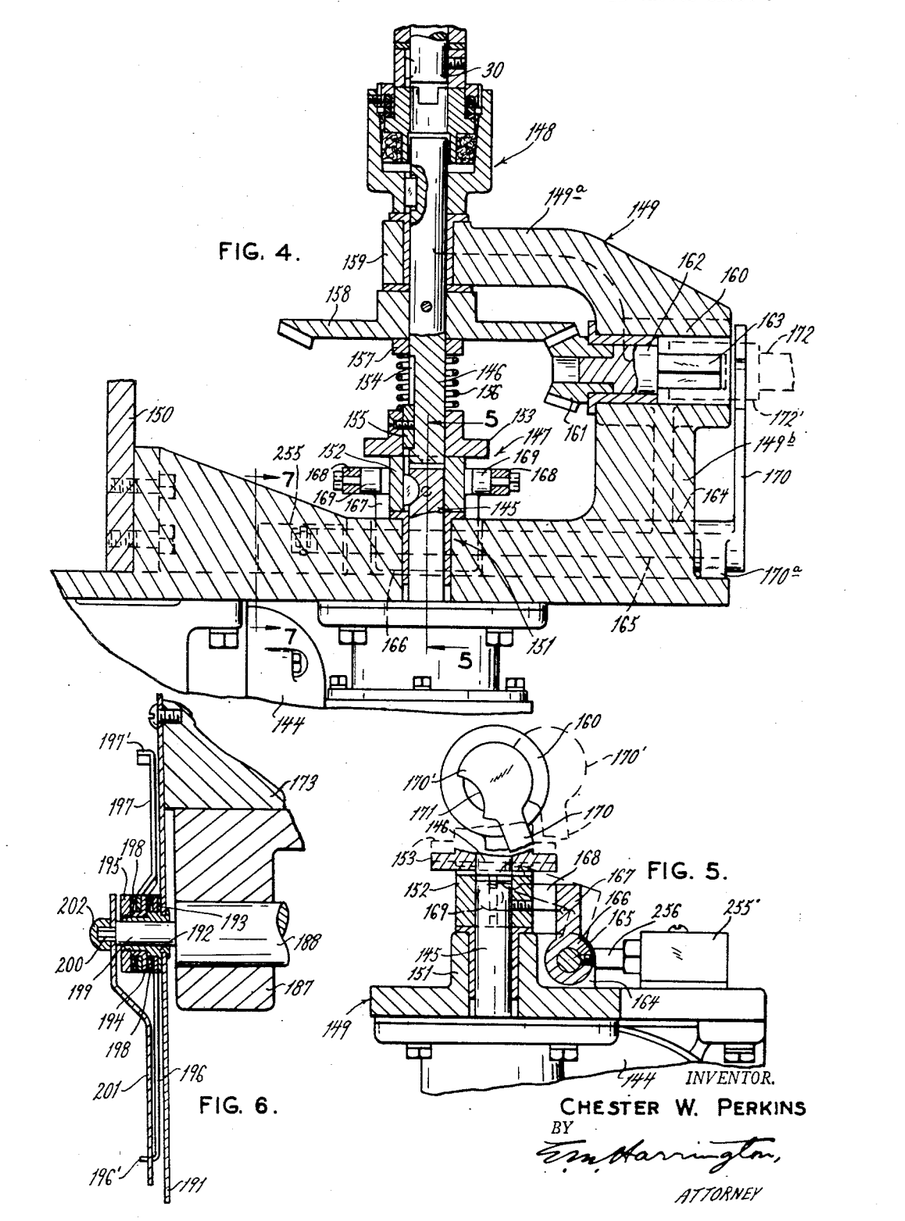
Fig. 4 is an enlarged, fragmentary, vertical section taken on line 4—4 of Fig. 2.
Fig. 5 is a fragmentary, vertical section taken on line 5—5 of Fig. 4.
Fig. 6 is an enlarged, fragmentary vertical section taken on line 6—6 of Fig. 2.

The operating mechanism of the improved tap changer of this invention includes a motor 144 which has associated therewith a suitable reduction with said motor serving to drive a shaft 145 (Fig. 4). The shaft 145 is connected to a shaft 146 through the instrumentality of a clutch structure 147, and said shaft 146 in turn is connected to the previously mentioned shaft 30 through the instrumentality of a second clutch structure 148. The shafts just referred to are supported for operation by a bracket 149 which is bolted to a part 150 of the tap changer structure, the motor 144 being bolted, or otherwise secured, to the bracket 149. The bracket 149 includes a horizontal portion that is provided with a bearing 151 by which the shaft 145 is supported for rotation and keyed on the upper portion of the shaft 145 is a collar 152. The upper edge of the collar 152 is engaged by a flanged clutch member 153 which is mounted on the lower portion of the shaft 146 for rotary movement therewith, said shaft being provided with a longitudinally extended groove 154 in which an element 155 that is fixed to the clutch member 153 may move longitudinally thereof. A coil spring 156, which embraces the shaft 146, contacts at one end thereof with the top edge of said clutch member 153, and at its opposite end said coil spring contacts with a washer 157 that bears against a bevel gear 158 which is fixed to the shaft 146 for rotation therewith.

The shaft 146 is supported for rotation by a bearing 159 which is located at the outer end of a horizontal portion 149a of the bracket 149, there being a horizontal bearing 160 formed in a vertical portion 149b of the bracket 149 which supports for rotation a bevel pinion 161 that meshes with the bevel gear 158. The bevel pinion has a shaft portion 162 which is supported in the bearing 160 and this shaft portion is provided with an extension 163 of noncircular cross-sectional shape, said extension being disposed entirely within the bearing 160, as is shown in Fig. 4. The bracket 149 includes a bearing portion 164 that supports for oscillation a shaft 165, and fixedly mounted on said shaft is a lever 166 that includes an upstanding portion 167 and a bifurcated portion 168 which partially embraces the collar 152. The spaced legs of the bifurcated portion 168 of the lever 166 have mounted thereon, inwardly thereof, rollers 169 which normally underlie the flange of the clutch member 153, as is shown in Fig. 4. Also, the shaft 165 has secured thereto an arm 170 which is provided with an enlarged portion 170′ at its upper end, said enlarged portion being provided with a notch 171 and normally being disposed at the outer end of the bearing 160 of the bracket 149 so that it blocks entrance to said bearing (Fig. 5).

The tap changer of the present invention may be operated electrically through operation of the motor 144 or manually when required. When operated electrically the motor 144 rotates the shafts 145, 146, and 30 to cause the various mechanisms of the tap changer to perform their functions, the clutch member 153 being forced by the coil spring 156 into tight engagement with the collar 152 so as to cause the shafts 145 and 146 to rotate as one shaft. However, if it should be necessary to operate the tap changer manually, the arm 170 is moved from the full line to the dotted line position thereof in Fig. 5 so as to expose the outer end of the bearing 160 and permit the socket end portion 172′ of a handle 172 to be inserted into the bearing 160 and into engagement with the extension 163 of the bevel pinion shaft 162. When the arm 170 is moved as described, the rollers 169 carried by the bifurcated portion of the lever 166 contact with and elevate the clutch member 153 out of contact with the collar 152 so as to disconnect the shafts 145 and 146 and permit the tap changer to be operated by rotating the handle 172 and thereby subjecting the shaft 146 to rotation through cooperation of the bevel gears 158 and 161. The arm 170 is provided with abutment elements 170a which are adopted to contact with the bracket 149 so as to limit movement of said arm in one or the opposite direction. The function of the clutch 148 is to protect the various mechanisms of the tap changer from damage resulting from application of excessive torque. The clutch 148 is a slip clutch and it breaks at over-torque, being factory-adjusted to slip at approximately 50% overload. The particular clutch illustrated is obtainable on the open market and a characteristic of said clutch is that it automatically resets itself when the excessive torque has been discontinued.

Figure 1:
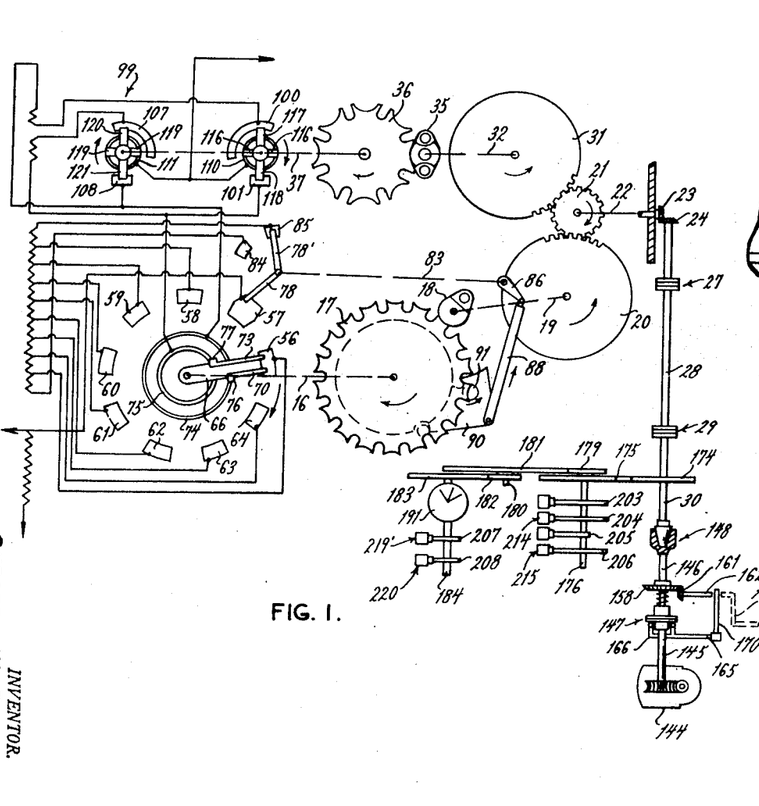
Fig. 1 is a schematic view illustrating diagrammatically the electrical wiring and certain mechanical parts of the structure of this invention.
Figure 2:
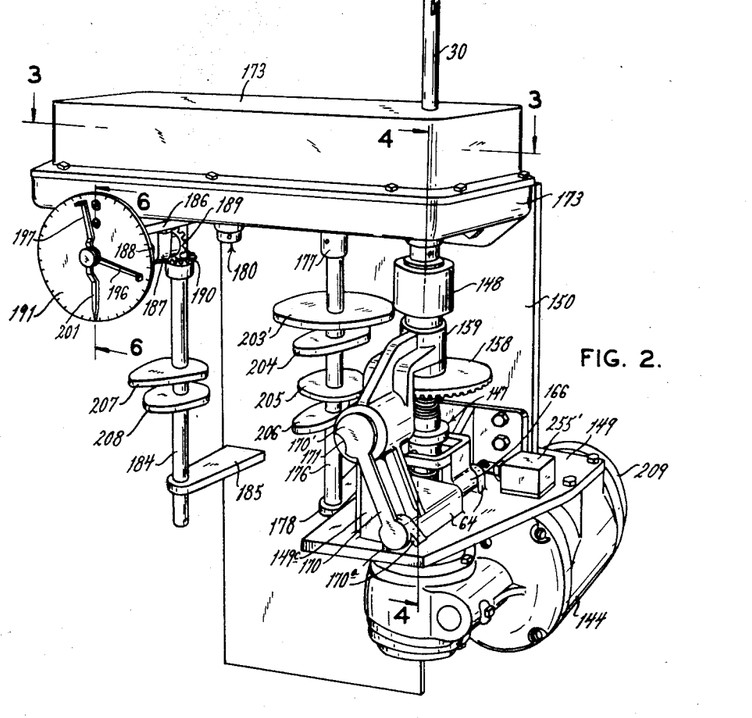
Fig. 2 is a perspective view illustrating the motor drive and other adjacently located parts of the tap changing mechanism of this invention.
Figure 3:
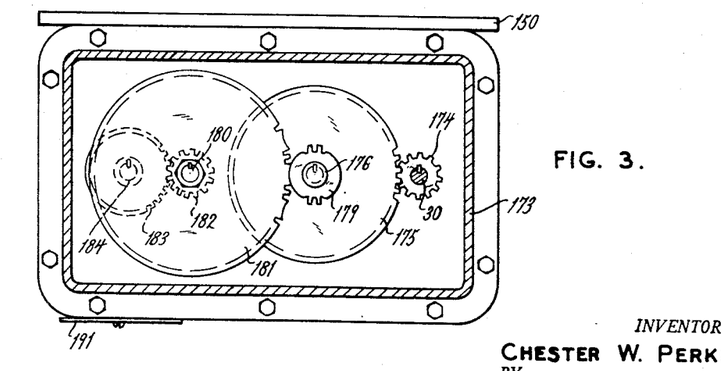
Fig. 3 is a horizontal section taken on line 3—3 of Fig. 2.

At a point above the clutch 148 the shaft 30 extends through a housing 173 which is fixed to the part 150, and within this housing said shaft 30 has a gear pinion 174 fixedly mounted thereon, as is shown in Fig. 3. The pinion 174 meshes with a spur gear 175 which is mounted on a vertically disposed shaft 176, said shaft 176 being supported for rotation in a housing bearing 177 and a bearing forming a part of a member 178 extended forwardly from the part 150. Fixedly mounted on the shaft 176 and located within the housing 173 is an intermittent driving pinion 179, and mounted on a stud shaft 180 is an intermittent driven gear 181 with which the intermittent driving pinion cooperates. Also, a gear pinion 182 is supported by the stud shaft 180 and rotates with the intermittent driven gear, and this gear pinion meshes with a spur gear 183 which is fixedly mounted on a vertical shaft 184. The shaft 184 is supported for rotation by a lower arm 185 which extends outwardly from the part 150, and by an upper arm 186 which is secured to the bottom wall of the housing 173 at the lower face thereof. The upper arm 186 has fixed thereto a bearing 187 which supports a horizontal shaft 188, said horizontal shaft having fixedly mounted thereon a bevel gear 189 which meshes with a similar bevel gear 190 that is fixedly mounted on the shaft 184 (Fig. 2).

The forward wall of the housing 173 has fixed thereto a dial 191, and secured to said dial is a sleeve 192 which extends through an opening formed centrally of said dial (Fig. 2). The sleeve includes an annular portion 193 that contacts with an annular portion of the front face of the dial 191 immediately surrounding the control opening of said dial, and the sleeve is secured to the dial by having its rear portion peened over into engagement with an annular portion of the rear face of the dial, as is shown in Fig. 6. The sleeve 192 has associated therewith an annular member 194 which is of angular cross-sectional shape, and, also, the sleeve 192 has screwthreadedly mounted on its forward portion a nut 195. The sleeve 192 supports maximum and minimum position indicators 196 and 197, said indicators 196 and 197 being rotatable about said sleeve and having outturned portions 196' and 197' at the outer ends thereof. The indicators 196 and 197 are provided with openings through which the sleeve 192 projects and spring washers 198 are employed that engage portions of said indicators and serve to retain them in positions to which they may be adjusted, one of said spring washers forcing a part of the indicator 196 against the annular portion 193 of the sleeve and another of said spring washers forcing a part of the indicator 197 against a portion of the annular member 194. The shaft 188 is provided at its forward end with a forwardly projected extension 199 having a screwthreaded stem 200, said stem being extended through an opening formed through a portion of a pointer 201, and receiving a nut 202 which securely fixed the pointer 201 to the shaft 188.

The shaft 176 (Fig. 2) has fixedly mounted thereon a plurality of cams 203', 204, 205, and 206, while the shaft 184 has fixedly mounted thereon a cam 207 and a cam 208. The cams of the shafts 176 and 184 perform functions which will be apparent when the operation of the tap changer of this invention is described. Also, it is pointed out that the motor 144 is provided with a casing 209 at one end of the housing of said motor. This casing houses a brake mechanism (not shown) comprising a brake drum mounted on the motor shaft and brake shoes which engage the brake drum when braking force is applied. However, since the brake mechanism is of conventional construction and arrangement it will not be described in detail herein.

OPERATION

To place the tap changer in manual operation the control switch 210 (Fig. 22B) is actuated to the "Raise" position whereby the starter coil 211 is energized. The contact 212 closes to energize and release the motor brake, and the contact 213 closes to energize and start the motor 144 in the raise direction. After the motor starts and just before the tap changer leaves position, pilot motor cams 204 and 206 close contacts 214 and 215, the closing of contact 215 causing the lamp 216 to light. When the lamp 216 is lighted, the control switch 210 may be turned to the "Off" position because contact 214 seals in the coil 211 through the contact 217 which at this time is closed. When the tap changer reaches the next position the contact 214 opens, deenergizing the coil 211 thereby opening the brake and motor circuits. To operate to a lower position, the procedure is similar, the coil 218 being energized in this case. If more than one step is desired at a time the control switch 210 is kept closed until the desired number is obtained. The contact 219 is a back contact on the contactor which is normally closed when the coil 211 is deenergized, its purpose being, in case of loss of control power while the tap changer is between positions, to return the tap changer to the next lower position automatically on the restoration of power. On either position the limit switch 219' or the limit switch 220 opens to prevent the tap changer from going beyond the last position. If the control switch 210 is moved to either "Raise" or "Lower," the operation is the same as described above.

Automatic operation

With the control switch 210 set on "Auto," the circuits are set up for automatic operation. Automatic operation is obtained by the use of a voltage regulating relay, a line drop compensator, time delay relay, and auxiliary relays. The voltage regulating relay is set up to respond to system voltage changes and thus operate the tap changing equipment to maintain a constant voltage on the load side, or at the load center. Its source of excitation is a potential transformer connected across the load side, and its operation and adjustment will be explained later herein. The time delay may be set to energize the motor after a definite period of time, thus eliminating unnecessary tap changes for voltage variations of short duration, as later described. The tap changer motor is supplied from a voltage source separate from the potential supply to the voltage regulating relay. With the control switch 210 set on "Auto," if the line potential rises above or falls below the value for which the voltage regulating relay is set, it will operate to change taps in the tap changer to correct this variation. Comparatively small variations in voltage will occur more frequently than would warrant correction, due to the character of the load, and in order to avoid excessive operations of the tap changing equipment, a time delay is interposed between the voltage regulating relay and the motor mechanism. This time delay prevents the operating mechanism from starting unless the voltage variation from the set value persists beyond the time setting of the relay.

When the control switch 210 is set for automatic operation and a tap change is required, for instance, to raise the voltage, the voltage regulating relay closes contact 223, thereby energizing the time delay which subsequently operates, energizing the interposing auxiliary relay 222. The current taken by the time delay relay is so small that it has no effect on the holding coil 247 of the voltage regulating relay. But, as soon as the coil of the relay 222 is energized a comparatively heavy current is drawn through the coil 247 which pulls the voltage regulating contact into firm contact so that no contact bounce will occur. When the relay 222 is energized, it closes contact 224 to seal around the time delay contact which closes only momentarily, and it also closes contact 225 which energizes the starter so as to start the motor, as described previously herein. Contact 226 of the motor starter also closes to seal around the voltage regulating relay contact so that any momentary voltage variation will not interfere with the tap changing operation. When the tap changer is operating in the "lower" direction, the procedure is similar to that described above. A condenser 222' is provided around the auxiliary relay coils for arc suppression in case the voltage regulating relay contacts try to interrupt the current to the auxiliary relay. The pilot motor switch 203 opens just after pilot motor switch 214 closes, and this interrupts the time delay circuit and the auxiliary relay circuit, giving instantaneous reset of the timing relay. When the next step is reached, the control goes through the same procedure in case the voltage is not corrected; that is, a time delay is interposed after each step of the tap changer.

Time delay

Figure 22A:
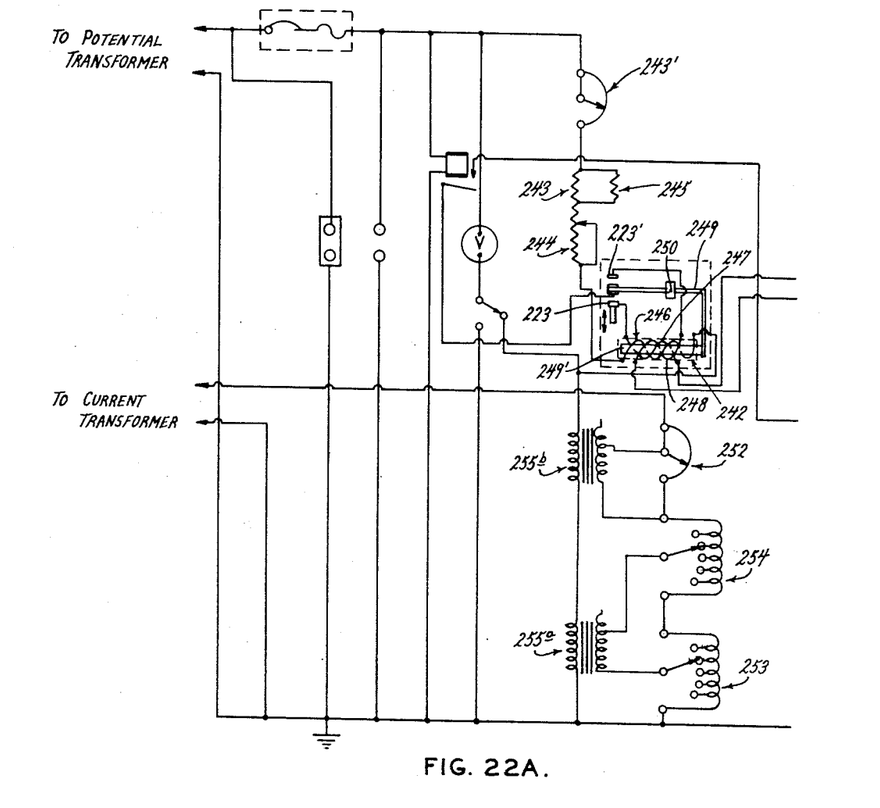
Fig. 22A, Fig. 22B, and Fig. 22C in combination illustrate diagrammatically the electrical wiring arrangement of the tap changer of this invention.
Figure 22B:
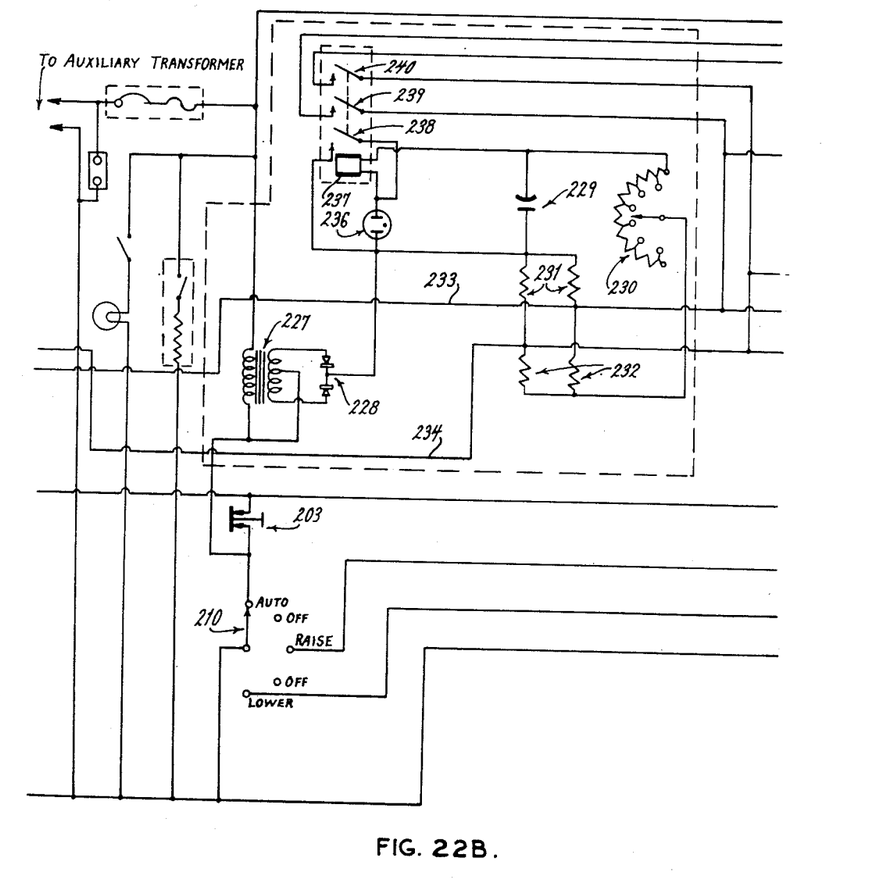
Figure 22C:
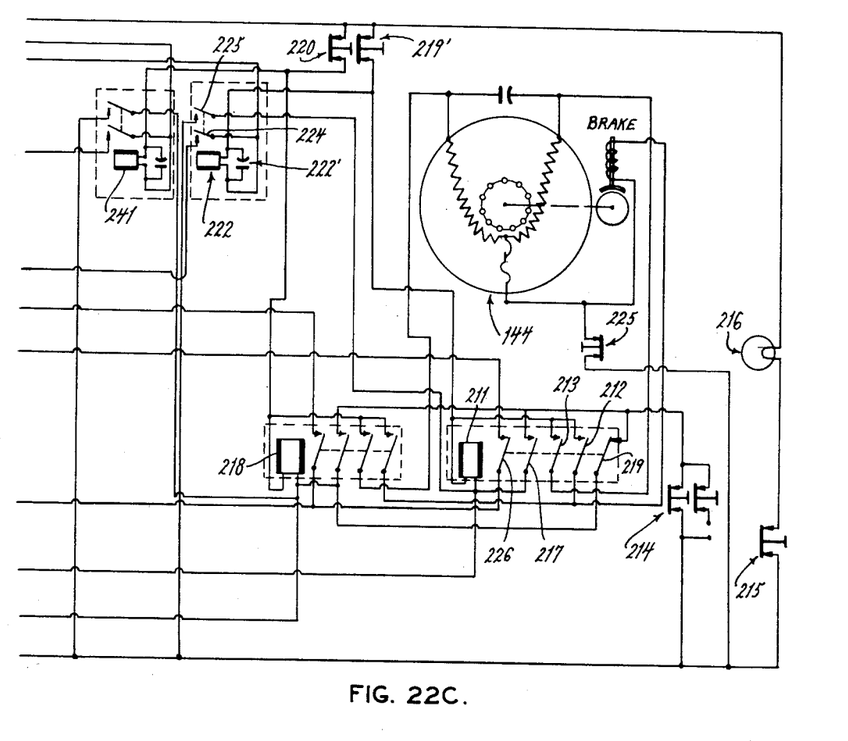

The principle of operation of the neo-time delay circuit is the time-required-to-charge-a-condenser principle. Referring to Fig. 22B, the potential is applied across the transformer 227. 228 designates a full wave selenium rectifier which changes the A. C. current to D. C. current for application across the condenser-resistance circuit consisting of condenser 229, time delay adjustment switch 230, resistors 231 and 232 and back through either lead 233 or 234, depending on which contact of the voltage regulating relay is closed. The values of the resistances 230, 231, and 232 and condenser 229 determine the time required for a sufficient charge to build up across the condenser to cause the cold cathode voltage regulator tube 236 to flash over and complete the circuit through the coil of the time delay auxiliary relay 237. The time delay adjustment switch comprises an adjustable resistance that is used to set the time delay by means of a control switch located on the main control panel. The time relay may be adjusted from approximately 15 seconds to 85 seconds in ten approximately equal steps. The controls are set at the factory for approximately 50 seconds time relay, and if a different time delay is required it is necessary, only, to change the control switch to the desired position. When the tube 236 flashes over and the coil of the time delay 237 is energized, the time delay contacts close momentarily. The time delay contacts 238 shorts the voltage regulator tube 236 to get complete discharge of the condenser so that the time delay will be the same for a subsequent operation. Time delay switches 239 and 240 complete the circuit from the voltage regulating relay contacts connected to the leads 233 or 234, depending on which one is closed to energize the interposed coils 222 or 241. The time delay is reset immediately when the tube 236 discharges.

Voltage regulating relay

Figure 23:
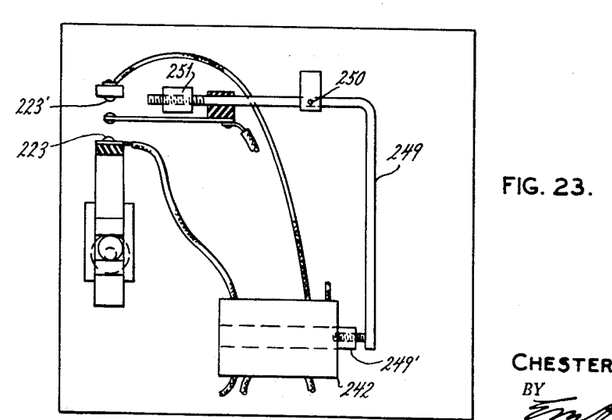
Fig. 23 is a view partly in elevation and partly in section illustrating a voltage regulating relay which forms a part of the structure of this invention.

The voltage regulating relay is provided to control automatically the voltage to be held by the tap changing under load equipment. This device consists of an alternating current solenoid 242 which operates a set of single-pole, double-throw contacts, the upper contact 233' closing when the voltage is too high, causing the voltage to lower, and the lower contact 223 closing when the voltage is too low, causing the voltage to raise. Resistors 243 and 244 and a negative temperature coefficient resistor 245 are provided in the solenoid circuit for ballast and correct operation over any expected temperature range. Two other auxiliary windings are wound on the solenoid core along the main winding 246, these windings being designated 247 and 248 and are connected with the raise contacts and the lower contacts, respectively. When the time delay is energized through either of the voltage regulating relay contacts, the current through the windings is so small as to have no effect on the main solenoid coil 246. This means that the voltage regulating relay can be made for maximum sensitivity and yet obtain a holding effect to maintain firm contact and assure no chattering when current necessary to operate either the auxiliary relay coils 247 and 248 flows through the holding coils. Either the auxiliary relay coil 247 or the auxiliary relay coil 248 is in the circuit at the start, only, of a tap changing operation, the auxiliary relay coil being taken out of the circuit immediately after the tap changing operation starts, as described previously herein. The balance arm 249 (Fig. 23) is supported by means of a pivot 250, and is provided with a counterweight 251 which is adjusted and set at the factory and need not be varied thereafter, said balance arm having a portion 249' which is extended into the solenoid 242.

The difference in the voltage value at which the "raise" contacts close and that at which the "lower" contacts close, is called the "band width," and this band width may be adjusted by a suitable knob, this knob serving to raise or lower the low contact to obtain the desired band width. The voltage regulating relay may be subjected to two adjustments, these adjustments being to adjust the band width and to adjust the voltage level through the variable resistor 243'. The band width, or voltage band, should be such that an operation of the tap changer through one step will restore the voltage so that the relay beam is rebalanced midway between the contacts. To obtain this condition, the band width should be approximately equal to twice the voltage step of the tap changer. Narrower bands may be used by allowing the voltage to over-shoot slightly the midpoint of the band; but in no case, should the band be less than the percent voltage step of the tap changer, as a smaller value than this will result in excessive operations of the tap changer.

Line drop compensator

In the line drop compensator arrangement, a current flowing through the compensator circuit 252, 254, and 253 from the secondary of the current transformer, proportional to the line current, causes a voltage drop in the compensator circuit which is transferred through transformers 255a and 255b to the voltage regulating relay circuit. This voltage is subtracted from the voltage applied to the voltage regulating relay by the potential transformer, and by setting the resistance 252 and reactance elements 253 and 254 of the compensator to suitable valves, the voltage drop may be made to correspond exactly in value and phase angle with that in the line. The amount of line drop compensation obtained is adjustable up to 24 volts resistance or reactance by means of suitable dial adjustments.

The step-by-step operations of the several parts of the tap changer, beginning with the application of voltage to the driving motor 144, are given here in sequence. With the "raise" limit switch 219' closed, a voltage applied by the control mechanism to the driving motor causes rotation of the tap changing mechanism from No. 1 position (lowest output voltage) toward No. 2 position, and so on to No. 3 position. Driven by the main drive shaft 30, and the parts associated therewith, Geneva pinions 18 and 35 rotate to engage their respective Geneva gears 17 and 36. The pinion of the load transfer switch actuates the gear that moves the transfer switch contacts approximately ninety degrees of pinion rotation ahead of the contact of the pinion with the selector switch gear. Therefore, the transfer switch operation, opening or closing, takes place far in advance of the motion in the tap selector switch, and consequently, all arcing in the selector switch is avoided.

Figure 24:
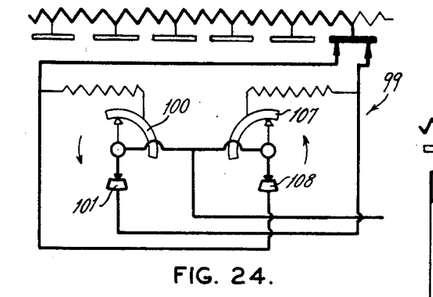
Figs. 24, 25, 26, 27, 28, 29, and 30 are diagrammatical views illustrating certain operations of the tap changer of this invention.
Figure 25:
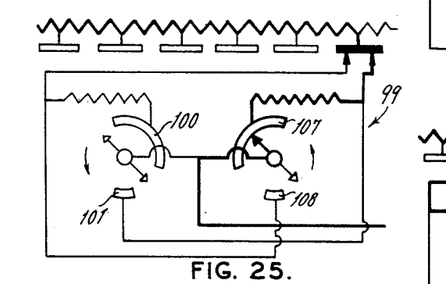
Figure 26:
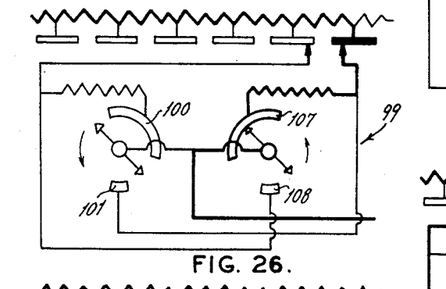
Figure 27:
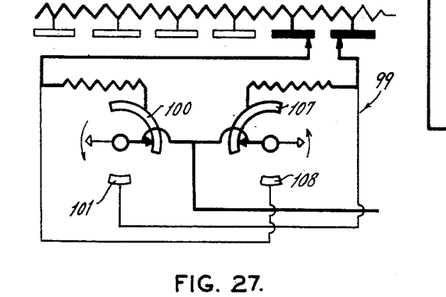
Figure 28:
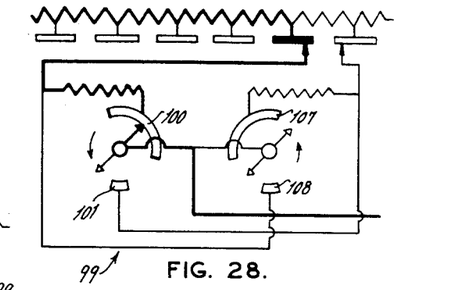
Figure 29:
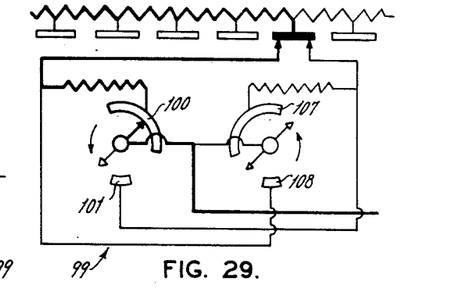
Figure 30:
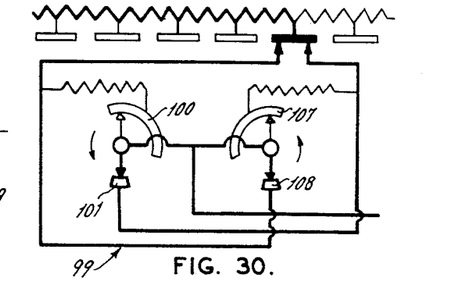

In describing the sequence of switching operations attention is directed first to Fig. 24 which shows switch positions for load tap changer operating position No. 1. The function of the reversing switch assembly 79 is to change the polarity of the buck-boost winding when the tap changer moves from a boost to a buck operating position, or vice versa, and the showing of Fig. 24 assumes that the reversing switch is in the buck position, and a ten percent voltage buck is provided in this position. It is to be noted that the reactor is by-passed. Assuming now that there has been an increase in load and that the line voltage has decreased, the automatic control, after a time delay, actuates the driving motor. The motor drive mechanism rotates the load transfer switch forty-five degrees in a counter-clockwise direction, shunting all of the current through one-half of the switching reactor. While the load transfer switch remains in the position shown in Fig. 25, the motor drive mechanism continues to operate and it rotates the tap selector switch to the bridging position shown in Fig. 26. It is to be noted that no arcing takes place since no current is flowing through the moving contact 70. As is shown in Fig. 27, the load transfer switch rotates forty-five degrees in a counter-clockwise direction causing current to flow through both halves of the reactor, and the load tap changer is now in bridging position, which is operating position No. 2, and tap change has been completed. The motor drive continues to operate and rotates the load transfer switch forty-five degrees in a counter-clockwise direction, again shunting all of the current through one-half of the reactor in preparation for the movement of the tap selector switch 73 to its next position (Fig. 28). With no current flowing through moving contact 73, the tap selector switch now moves to the next position, as is shown in Fig. 29, with contractors 70 and 73 on stationary contact 64. Next the load transfer switch rotates forty-five degrees in a counter-clockwise direction to complete the tap change. There is no reactor loss since the current flows through parallel by-passing circuits to the line, and the tap changer is now in operating position No. 3, as is shown in Fig. 30.

Figure 7:
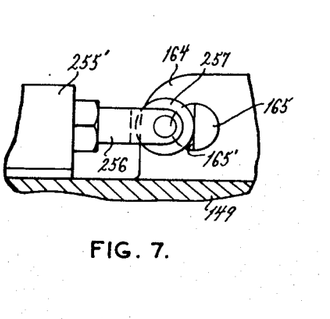
Fig. 7 is a fragmentary, vertical section taken on line 7—7 of Fig. 4.

Fig. 7 illustrates a switch structure which is contained within the housing 255' and which includes an operating rod 256, adapted for reciprocating movement, said rod having a bifurcated outer end portion between the spaced legs of which is mounted for rotation a roller 257. An end portion of the shaft 165 is provided with a flat portion 165' with which the circumferential face of the roller 257 contacts. In its normal position the switch 255 contained within the housing 255' is closed, this being when the enlarged portion 170' of the arm 170 is in the position in which it is shown in Fig. 5. However, when the arm 170 is moved to its dotted line position in Fig. 5 rotation of the shaft 165 causes the flat portion 165' thereof to move the operating rod 256 of the switch inwardly so as to open the motor circuit in which the switch is interposed.

In the operation of the accelerator shown in Figs. 10, 11, and 12, the Geneva gear 36 is held against rotation by the roller 48 of the spring-loaded arm 49, said roller being disposed between a pair of adjacent teeth 47 formed on the element 46 and the coil spring 55 serving to hold said element 46 against rotation. However, when the coil springs 41 have been stressed sufficiently the roller 48 will be raised by the turning force imparted to the Geneva gear 36 and the element 46 by the coil springs 41 so as to subject the Geneva gear and the element 46 to rapid motion. Also, by referring to Fig. 16 it will be noted that the moving contacts of the load transfer switch are provided with pairs of vanes 117' and 118' which serve to direct oil radially and outwardly into the arc path.

I claim:

1. A transformer tap changing structure comprising tap selector means, a reversing switch operable to shift the transformer winding voltage vectorially with respect to another winding voltage, a load transferring switch assembly which performs the transfer from one parallel circuit to another parallel circuit, and a reactor for paralleling said circuits, said load transfer switch assembly serving to by-pass reactor windings with the tap changer in a single tap position, and means related to said load transferring switch assembly which serves to tie down all switching reactor ends in all operating positions.

2. A transformer tap changing structure comprising tap selector means, a reversing switch operable to shift the transformer winding voltage vectorially with respect to another winding voltage, a load transferring switch assembly of the rotary type which performs the transfer from one parallel circuit to another parallel circuit, and a reactor for paralleling said circuits, said load transfer switch assembly serving to by-pass reactor windings with the tap changer in a single tap position, and means related to said load transferring switch assembly which serves to tie down all switching reactor ends in all operating positions.

3. A transformer tap changing structure comprising tap selector means, a reversing switch operable to shift the transformer winding voltage vectorially with respect to another winding voltage, a load transferring switch assembly of the rotary type which performs the transfer from one parallel circuit to another parallel circuit, said load transfer switch assembly including a plurality of pairs of stationary contacts and a pair of rotatable contacts adapted for contact with said stationary contacts, certain contacts of said pairs of stationary contacts being of elongated arcuate formation, and a reactor for paralleling said circuits, said load transfer switch assembly serving to by-pass reactor windings with the tap changer in a single tap position, and said load transferring switch assembly serving to tie down all switching reactor ends in all operating positions.

4. A transformer tap changing structure comprising tap selector means, a reversing switch operable to shift the transformer winding voltage vectorially with respect to another winding voltage, a load transferring switch assembly of the rotary type which performs the transfer from one parallel circuit to another parallel circuit, said load transfer switch assembly including a plurality of pairs of stationary contacts and a pair of rotatable contacts adapted for contact with said stationary contacts and one contact of each pair of stationary contacts being of elongated arcuate formation, and a reactor for paralleling said circuits, said load transfer switch assembly serving to by-pass reactor windings with the tap changer in a single tap position, and said load transferring switch assembly serving to tie down all switching reactor ends in all operating positions.

5. A transformer tap changing structure comprising tap selector means, a reversing switch operable to shift the transformer winding voltage vectorially with respect to another winding voltage, a load transferring switch assembly of the rotary type which performs the transfer from one parallel circuit to another parallel circuit, said load transfer switch assembly including a plurality of pairs of stationary contacts and a pair of rotatable contacts adapted for contact with said stationary contacts and one contact of each pair of stationary contacts being of elongated arcuate formation and the other thereof being of minimum operable width, and a reactor for paralleling said circuits, said load transfer switch assembly serving to by-pass reactor windings with the tap changer in a single tap position, and said load transferring switch assembly serving to tie down all switching reactor ends in all operating positions.

6. A transformer tap changing structure comprising tap selector means, a reversing switch operable to shift the transformer winding voltage vectorially with respect to another winding voltage, a load transferring switch assembly of the rotary type which performs the transfer from one parallel circuit to another parallel circuit, said load transfer switch assembly including a pair of stationary contacts and a pair of rotatable contacts adapted for contact with said stationary contacts, a reactor for paralleling said circuits, said load transfer switch assembly serving to by-pass reactor windings with the tap changer in a single tap position, and said load transferring switch assembly serving to tie down all switching reactor ends in all operating positions, and vane means mounted for movement with said rotatable contacts for directing oil into the paths of electrical arcs created adjacent to the positions of said rotatable contacts.

7. A transformer tap changing structure comprising tap selector means, a reversing switch operable to shift the transformer winding voltage vectorially with respect to another winding voltage, a load transferring switch assembly of the rotary type which performs the transfer from one parallel circuit to another parallel circuit, a reactor for paralleling said circuits, said load transfer switch assembly serving to by-pass reactor windings with the tap changer in a single tap position, and said load transferring switch assembly serving to tie down all switching reactor ends in all operating positions, and a compartment in which the load transferring switch assembly is enclosed whereby arc gases in proximity to the position of the load transferring switch assembly are confined to a definite area.

8. A transformer tap changing structure comprising tap selector means, a reversing switch operable to shift the transformer winding voltage vectorially with respect to another winding voltage, a load transferring switch assembly which performs the transfer from one parallel circuit to another parallel circuit, a reactor for paralleling said circuits, said load transfer switch assembly serving to by-pass reactor windings with the tap changer in a single tap position, and said load transferring switch assembly serving to tie down all switching reactor ends in all operating positions, and acceleration means for subjecting the movable contacts of the load transferring switch assembly to rapid movement relative to the stationary contacts of said load transferring switch assembly.

9. A transformer tap changing structure comprising tap selector means, a reversing switch operable to shift the transformer winding voltage vectorially with respect to another winding voltage, a load transferring switch assembly which performs the transfer from one parallel circuit to another parallel circuit, a reactor for paralleling said circuits, said load transfer switch assembly serving to by-pass reactor windings with the tap changer in a single tap position, and said load transferring switch assembly serving to tie down all switching reactor ends in all operating positions, and acceleration means for subjecting the movable contacts of the load transferring switch assembly to rapid movement relative to the stationary contacts of said load transferring switch assembly, said acceleration means comprising a gear member which is subjected to rotary movement during operation of the tap changer, a rotary element, spring means for connecting said rotary element to said gear member for independent movement with respect thereto, and spring-loaded locking means for preventing movement of said rotary element until said spring means has been stressed by rotation of said gear member to a point where said spring means may overcome the holding force of said spring-loaded locking means.

10. A transformer tap changing structure comprising tap selector means, a reversing switch operable to shift the transformer winding voltage vectorially with respect to another winding voltage, a load transferring switch assembly which performs the transfer from one parallel circuit to another parallel circuit, a reactor for paralleling said circuits, said load transfer switch assembly serving to by-pass reactor windings with the tap changer in a single tap position, and said load transferring switch assembly serving to tie down all switching reactor ends in all operating positions, and acceleration means for subjecting the movable contacts of the load transferring switch assembly to rapid movement relative to the stationary contacts of said load transferring switch assembly, said acceleration means comprising a gear member which is subjected to rotary movement during operation of the tap changer, a rotary element, spring means comprising a plurality of coil springs for connecting said rotary element to said gear member for independent movement with respect thereto, and spring-loaded means for preventing movement of said rotary element until said spring means has been stressed by rotation of said gear member to a point where said spring means may overcome the holding force of said spring-loaded locking means.

11. A transformer tap changing structure comprising tap selector means, a reversing switch operable to shift the transformer winding voltage vectorially with respect to another winding voltage, a load transferring switch assembly which performs the transfer from one parallel circuit to another parallel circuit, a reactor for paralleling said circuits, said load transfer switch assembly serving to by-pass reactor windings with the tap changer in a single tap position, and said load transferring switch assembly serving to tie down all switching reactor ends in all operating positions, and acceleration means for subjecting the movable contacts of the load transferring switch assembly to rapid movement relative to the stationary contacts of said load transferring switch assembly, said acceleration means comprising a gear member which is subjected to rotary movement during operation of the tap changer, a rotary element, spring means comprising a plurality of radially disposed coil springs for connecting said rotary element to said gear member for independent movement with respect thereto, and spring-loaded locking means for preventing movement of said rotary element until said spring means has been stressed by rotation of said gear member to a point where said spring means may overcome the holding force of said spring-loaded locking means.

12. A transformer tap changing structure comprising tap selector means, a reversing switch operable to shift the transformer winding voltage vectorially with respect to another winding voltage, a load transferring switch assembly which performs the transfer from one parallel circuit to another parallel circuit, a reactor for paralleling said circuits, said load transfer switch assembly serving to by-pass reactor windings with the tap changer in a single tap position, and said load transferring switch assembly serving to tie down all switching reactor ends in all operating positions, and acceleration means for subjecting the movable contacts of the load transferring switch assembly to rapid movement relative to the stationary contacts of said load transferring switch assembly, said acceleration means comprising a gear member which is subjected to rotary movement during operation of the tap changer, a Geneva pinion, spring means for connecting said Geneva pinion to said gear member in such manner that each is capable of independent movement with respect to the other, a Geneva gear with which said Geneva pinion cooperates and which is movable with the rotatable contacts of said load transferring switch assembly, and spring-loaded locking means for preventing movement of said Geneva gear until said spring means has been stressed by rotation of said gear member to a point where said spring means may overcome the holding force of said spring-loaded locking means.

13. A transformer tap changing structure comprising tap selector means, a reversing switch operable to shift the transformer winding voltage vectorially with respect to another winding voltage, a load transferring switch assembly which performs the transfer from one parallel circuit to another parallel circuit, a reactor for paralleling said circuits, said load transfer switch assembling serving to by-pass reactor windings with the tap changer in a single tap position, and said load transferring switch assembly serving to tie down all switching reactor ends in all operating positions, and acceleration means for subjecting the movable contacts of the load transferring switch assembly to rapid movement relative to the stationary contacts of said load transferring switch assembly, said acceleration means comprising a gear member which is subjected to rotary movement during operation of the tap changer, a Geneva pinion, spring means comprising a plurality of coil springs for connecting said Geneva pinion to said gear member in such manner that each is capable of independent movement with respect to the other, a Geneva gear with which said Geneva pinion cooperates and which is movable with the rotatable contacts of said load transferring switch assembly, and spring-loaded locking means for preventing movement of said Geneva gear until said spring means has been stressed by rotation of said gear member to a point where said spring means may overcome the holding force of said spring-loaded locking means.

14. A transformer tap changing structure comprising tap selector means, a reversing switch operable to shift the transformer winding voltage vectorially with respect to another winding voltage, a load transferring switch assembly which performs the transfer from one parallel circuit to another parallel circuit, a reactor for paralleling said circuits, said load transfer switch assembly serving to by-pass reactor windings with the tap changer in a single tap position, and said load transferring switch assembly serving to tie down all switching reactor ends in all operating positions, and acceleration means for subjecting the movable contacts of the load transferring switch assembly to rapid movement relative to the stationary contacts of said load transferring switch assembly, said acceleration means comprising a gear member which is subjected to rotary movement during operation of the tap changer, a Geneva pinion, spring means comprising a plurality of radially disposed springs for connecting said Geneva pinion to said gear member in such manner that each is capable of independent movement with respect to the other, a Geneva gear with which said Geneva pinion cooperates and which is movable with the rotatable contacts of said load transferring switch assembly, and spring-loaded locking means for preventing movement of said Geneva gear until said spring means has been stressed by rotation of said gear member to a point where said spring means may overcome the holding force of said spring-loaded locking means.

15. A transformer tap changing structure comprising tap selecting means including stationary contacts, and movable contacts which move relative to said stationary contacts into and out of contact therewith, driving means including a Geneva gear and pinion assembly for moving said movable contacts of said tap selecting means with respect to said stationary contacts thereof, a reversing switch operable to shift the transformer winding voltage vectorially with respect to another winding voltage and comprising stationary contacts, and movable contact means movable with respect to said stationary contacts, driving means including a Geneva gear and pinion assembly for moving said movable contact means of said reversing switch with respect to said stationary contacts thereof, a load transferring switch assembly comprising stationary contacts and movable contact means and which performs the transfer from one parallel circuit to another parallel circuit, driving means including a Geneva gear and pinion assembly for moving said movable contact means of said load transferring switch assembly with respect to said stationary contacts thereof, a reactor for paralleling said circuits, a main shaft for the tap changing structure, power means for subjecting said main shaft to rotation, and an insulating supporting member which supports said load transferring switch assembly as well as said tap selecting means and said reversing switch.

16. A transformer tap changing structure comprising tap selecting means including stationary contacts, and movable contacts which move relative to said stationary contacts into and out of contact therewith, driving means including a Geneva gear and pinion assembly for moving said movable contacts of said tap selecting means with respect to said stationary contacts thereof, a reversing switch operable to shift the transformer winding voltage vectorially with respect to another winding voltage and comprising stationary contacts, and movable contact means movable with respect to said stationary contacts, driving means including a Geneva gear and pinion assembly for moving said movable contact means of said reversing switch with respect to said stationary contacts thereof, a load transferring switch assembly comprising stationary contacts and movable contact means and which performs the transfer from one parallel circuit to another parallel circuit, an insulating barrier at one side of which one movable contact of said load transferring switch assembly and its related stationary contacts are arranged and at the opposite side of which another movable contact of said load transferring switch assembly and its related stationary contacts are arranged, driving means including a Geneva gear and pinion assembly for moving said movable contact means of said load transferring switch assembly with respect to said stationary contacts thereof, a reactor for paralleling said circuits, a main shaft for the tap changing structure, power means for subjecting said main shaft to rotation, means for preventing application of excessive torque to said drive shaft.

17. A transformer tap changing structure comprising tap selecting means including stationary contacts, and movable contacts which move relative to said stationary contacts into and out of contact therewith, driving means including a Geneva gear and pinion assembly for moving said movable contacts of said tap selecting means with respect to said stationary contacts thereof, a reversing switch operable to shift the transformer winding voltage vectorially with respect to another winding voltage and comprising stationary contacts, and movable contact means movable with respect to said stationary contacts, driving means including a Geneva gear and pinion assembly for moving said movable contact means of said reversing switch with respect to said stationary contacts thereof, a load transferring switch assembly comprising stationary contacts and movable contact means and which performs the transfer from one parallel circuit to another parallel circuit, an insulating barrier at one side of which one movable contact of said load transferring switch assembly and its related stationary contacts are arranged and at the opposite side of which another movable contact of said load transferring switch assembly and its related stationary contacts are arranged, driving means including a Geneva gear and pinion assembly for moving said movable contact means of said load transferring switch assembly with respect to said stationary contacts thereof, a reactor for paralleling said circuits, a main shaft for the tap changing structure, power means for subjecting said main shaft to rotation, means comprising a slip clutch for preventing application of excessive torque to said drive shaft.

18. A transformer tap changing structure comprising tap selecting means including stationary contacts, and movable contacts which move relative to said stationary contacts into and out of contact therewith, driving means including a Geneva gear and pinion assembly for moving said movable contacts of said tap selecting means with respect to said stationary contacts thereof, a reversing switch operable to shift the transformer winding voltage and comprising stationary contacts, and movable contact means movable with respect to said stationary contacts, driving means including a Geneva gear and pinion assembly for moving said movable contact means of said reversing switch with respect to said stationary contacts thereof, a load transferring switch assembly of the rotary type comprising stationary contacts and movable contact means and which performs the transfer from one parallel circuit to another parallel circuit, an insulating barrier at one side of which one movable contact of said load transferring switch assembly and its related stationary contacts are arranged and at the opposite side of which another movable contact of said load transferring switch assembly and its related stationary contacts are arranged, driving means including a Geneva gear and pinion assembly for moving said movable contact means of said load transferring switch assembly with respect to said stationary contacts thereof, a reactor for paralleling said circuits, a main shaft for the tap changing structure, power means for subjecting said main shaft to rotation.

19. A transformer tap changing structure comprising tap selecting means including stationary contacts, and movable contacts which move relative to said stationary contacts into and out of contact therewith, driving means including a Geneva gear and pinion assembly for moving said movable contacts of said tap selecting means with respect to said stationary contacts thereof, a reversing switch of the rotary type operable to shift the transformer winding voltage and comprising stationary contacts, and movable contact means movable with respect to said stationary contacts, driving means including a Geneva gear and pinion assembly for moving said movable contact means of said reversing switch with respect to said stationary contacts thereof, a load transferring switch assembly of the rotary type comprising stationary contacts and movable contact means and which performs the transfer from one parallel circuit to another parallel circuit, an insulating barrier at one side of which one movable contact of said load transferring switch assembly and its related stationary contacts are arranged and at the opposite side of which another movable contact of said load transferring switch assembly and its related stationary contacts are arranged, driving means including a Geneva gear and pinion assembly for moving said movable contact means of said load transferring switch assembly with respect to said stationary contacts thereof, a reactor for paralleling said circuits, a main shaft for the tap changing structure, power means for subjecting said main shaft to rotation.

20. A transformer tap changing structure comprising tap selecting means of the rotary type including stationary contacts, and movable contacts which move relative to said stationary contacts into and out of contact therewith, driving means including a Geneva gear and pinion assembly for moving said movable contacts of said tap selecting means with respect to said stationary contacts thereof, a reversing switch of the rotary type operable to shift the transformer winding voltage and comprising stationary contacts, and movable contact means movable with respect to said stationary contacts, driving means including a Geneva gear and pinion assembly for moving said movable contact means of said reversing switch with respect to said stationary contacts thereof, a load transferring switch assembly of the rotary type comprising stationary contacts and movable contact means and which performs the transfer from one parallel circuit to another parallel circuit, an insulating barrier at one side of which one movable contact of said load transferring switch assembly and its related stationary contacts are arranged and at the opposite side of which another movable contact of said load transferring switch assembly and its related stationary contacts are arranged, driving means including a Geneva gear and pinion assembly for moving said movable contact means of said load transferring switch assembly with respect to said stationary contacts thereof, a reactor for paralleling said circuits, a main shaft for the tap changing structure, power means for subjecting said main shaft to rotation.

References Cited in the file of this patent

UNITED STATES PATENTS

| Number | Name | Date |
|---|---|---|
| 2,157,922 | Schwaiger | May 9, 1939 |
| 2,177,109 | Hill | Oct. 24, 1939 |
| 2,246,182 | Palme et al. | June 17, 1941 |
| 2,480,589 | McKenney | Aug. 30, 1949 |

FOREIGN PATENTS

| Number | Country | Date |
|---|---|---|
| 740,587 | France | Nov. 21, 1932 |